(12) United States Patent
Maeda et al.

(10) Patent No.: US 10,850,318 B2
(45) Date of Patent: Dec. 1, 2020

(54) JOINING METHOD FOR MEMBERS

(71) Applicant: Kobe Steel, Ltd., Hyogo (JP)

(72) Inventors: Yasuhiro Maeda, Kobe (JP); Toru Hashimura, Kobe (JP); Kenichi Watanabe, Kobe (JP); Junya Naitou, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 70 days.

(21) Appl. No.: 16/084,145

(22) PCT Filed: Feb. 21, 2017

(86) PCT No.: PCT/JP2017/006410
§ 371 (c)(1),
(2) Date: Sep. 11, 2018

(87) PCT Pub. No.: WO2017/169307
PCT Pub. Date: Oct. 5, 2017

(65) Prior Publication Data
US 2020/0108432 A1    Apr. 9, 2020

(30) Foreign Application Priority Data
Mar. 29, 2016    (JP) .................................. 2016-066623

(51) Int. Cl.
*B21D 39/20* (2006.01)
*B21D 39/06* (2006.01)
(Continued)

(52) U.S. Cl.
CPC ........... *B21D 39/206* (2013.01); *B21D 39/04* (2013.01); *B21D 39/046* (2013.01); *B21D 39/06* (2013.01);
(Continued)

(58) Field of Classification Search
CPC ...... B21D 39/04; B21D 39/046; B21D 39/06; B21D 39/206; B21D 41/026; B21D 53/88;
(Continued)

(56) References Cited

U.S. PATENT DOCUMENTS 3,766,631 A * 10/1973 Scheitlin ................ B21D 39/06
29/424
4,515,305 A   5/1985 Hagemeister

FOREIGN PATENT DOCUMENTS

JP    1980-064938 A    5/1980
JP    1980-138438 U    10/1980
(Continued)

OTHER PUBLICATIONS

International Search Report issued in PCT/JP2017/006410, dated Apr. 11, 2017.
(Continued)

*Primary Examiner* — Jermie E Cozart
(74) *Attorney, Agent, or Firm* — Studebaker & Brackett PC

(57) ABSTRACT

A joining method for members includes: providing a steel component 10 including insertion holes 14a and 15a, an aluminum pipe 20 having a hollow shape, and a support component 30; inserting the aluminum pipe 20 into the insertion holes 14a and 15a of the steel component 10; and enlarging the aluminum pipe 20 through deformation and joining the aluminum pipe 20 to the steel component 10 by press-fitting. The press-fit joining is performed while at least part of the support component 30 is disposed in a press-fitting region.

20 Claims, 23 Drawing Sheets

(51) Int. Cl.
    *B21D 41/02*     (2006.01)
    *B21D 39/04*     (2006.01)
    *B23P 11/00*     (2006.01)
    *F16B 4/00*     (2006.01)
    *B21D 53/88*     (2006.01)
    *F16B 17/00*     (2006.01)

(52) U.S. Cl.
    CPC .......... *B21D 41/026* (2013.01); *B23P 11/005* (2013.01); *F16B 4/004* (2013.01); *B21D 53/88* (2013.01); *F16B 17/006* (2013.01); *Y10T 29/4994* (2015.01); *Y10T 29/49911* (2015.01); *Y10T 29/49938* (2015.01)

(58) Field of Classification Search
    CPC .............. B23P 11/005; Y10T 29/49911; Y10T 29/49938; Y10T 29/4994
    See application file for complete search history.

(56) References Cited

FOREIGN PATENT DOCUMENTS

| | | |
|---|---|---|
| JP | S58-103926 A | 6/1983 |
| JP | H06-341355 A | 12/1994 |
| JP | 2007-203325 A | 8/2007 |
| JP | 2007-222877 A | 9/2007 |
| JP | 2007-284039 A | 11/2007 |
| JP | 2010-046697 A | 3/2010 |

OTHER PUBLICATIONS

Notification of Transmittal of Translation of the International Preliminary Report on Patentability and Translation of Written Opinion of the International Searching Authority; PCT/JP2017/006410; dated Oct. 11, 2018.

\* cited by examiner

JOINING METHOD FOR MEMBERS

CROSS-REFERENCE TO RELATED APPLICATIONS

This is a national phase application in the United States of International Patent Application No. PCT/JP2017/006410 with an international filing date of Feb. 21, 2017, which claims priority of Japanese Patent Application No. 2016-066623 filed on Mar. 29, 2016 the contents of which are incorporated herein by reference.

TECHNICAL FIELD

The present invention relates to a joining method for members.

BACKGROUND ART

A high-strength thin steel plate called high-tension steel is used as a structural member of an automobile. Such a high-tension steel is effective for weight reduction and safety improvement, but is heavier than a low specific gravity material such as aluminum. The high-tension steel has problems such as decrease of forming easiness, increase of a forming load, and decrease of dimensional accuracy due to its high strength. In order to solve these problems, in recent years, multiple-material approach has been carried out utilizing extrusion molded products, cast products, and press molded products using aluminum, which has a smaller specific gravity than steel plates, together with steel parts.

The problem with multiple-material approach is joining of steel parts and aluminum parts. In the welding technique typified by spot welding, a brittle intermetallic compound (IMC) is generated at the interface between a steel plate and an aluminum plate, so electromagnetic forming bonding, screw fastening typified by bolts and nuts, friction stir welding (FSW), rivets, self-piercing rivets (SPR), mechanical clinching, and adhesion are put to practical use.

In press-fitting by electromagnetic forming, a solenoid formed coil is inserted into a pipe component fitted to a mating component, and induced current is induced in the conductive pipe by change in a magnetic field generated by applying impact current to the coil. Electromagnetic force is generated between magnetic field generated by the primary current of the coil and induced current flowing in the opposite direction along the circumferential direction of the pipe. In this case, the pipe receives outward moving force, and thus is expanded and deformed to be joined to the mating component by press-fitting. This joining method is suitable for copper and aluminum, which are highly electrically conductive, and is practically used in parts of joining of automobile components.

JP 2007-284039 A discloses a press-fit joining technology by electromagnetic forming for multiple-material approach. In the technology of JP 2007-284039 A, a bumper reinforcement made of a metal material and having a hollow section is expanded and deformed by electromagnetic forming, and accordingly, fitted and joined to a hole provided to a bumper stay made of aluminum alloy.

SUMMARY OF THE INVENTION

Problems to be Solved by the Invention

In the electromagnetic forming of JP 2007-284039 A and any other joining method, the joining strength is desired to be increased. It is preferable to improve member strength to increase the joining strength. This can be achieved by increasing material hardness and increasing plate thicknesses. However, the risk of cracks at impact increases as the member hardness increases, and the weight of a component increases as the plate thickness increases. Alternatively, fabrication such as burring can be provided to a joining part to increase the joining strength, but the burring fabrication is difficult in some cases, depending on the shape of the joining part. In addition even when the joining part has a shape that allows the burring fabrication, man-hours are increased by the fabrication, which leads to increase of manufacturing cost.

The present invention is intended to achieve increase of joining strength in a joining method for members by press-fit joining, while suppressing increase in the weights of the members.

Means for Solving the Problems

A joining method for members according to the present invention includes: providing a first member having a first insertion hole, a second member having a hollow shape, and a third member; inserting the second member into the first insertion hole of the first member; and expanding and deforming the second member to join the second member to the first member by press-fitting. The press-fit joining is performed while at least part of the third member is disposed in a press-fitting region.

According to this method, joining strength can be increased in the joining method for members by press-fit joining while increase in the weights of the members is suppressed. The joining strength is a concept including pulling strength, bending strength, and fatigue strength. Specifically, the third member, which is disposed in the press-fitting region, can function as an anti-removal member that prevents the second member from coming off the first member, and function as a reinforcement member that reduces loads on the first and second members. Thus, the joining strength can be increased without increasing the plate thicknesses of the first and second members, and weight increase can be minimized since the third member only needs to be disposed in the press-fitting region. The press-fitting region refers to a joining part between the first and second members and the vicinity of the joining part.

The second member and the third member may be further joined to each other by the press-fitting.

When the second member and the third member are further joined by the press-fitting, the first member, the second member, and the third member are integrally joined by the press-fitting, thereby further increasing the joining strength.

The third member may be disposed adjacent to a joining part between the first member and the second member.

When the third member is disposed adjacent to the joining part, the third member functions as an anti-removal member at application of removing force to the second member, thereby increasing the pulling strength. The third member also functions as a reinforcement member near the joining part, thereby increasing the bending strength and the fatigue strength.

The third member may have a hollow shape including an insertion hole, the third member may be disposed so that an axis line of the third member extends in parallel to an axis line of the second member, and the second member may be inserted into the insertion hole of the third member and joined to the third member by the press-fitting.

According to this method, the pulling strength can be increased, in particular. When removing force is applied to the second member, the force is transferred from the second member through the third member to a large region of the first member including the joining part as compared to a configuration with no third member, which prevents stress concentration. Thus, deformation of the first member can be suppressed, and the second member can be prevented from coming off the first member along with the deformation.

The third member may be disposed so that the third member and the first member planarly contact with each other in the press-fitting region and an axis line of the third member extends in a direction different from the axis line of the second member.

According to this method, the bending strength can be increased in the press-fitting region, in particular. Since the third member planarly supports the first member in the press-fitting region, an effect of increasing the bending strength equivalent to that achieved with a configuration in which the first member has an increased plate thickness in the press-fitting region can be obtained.

At least part of the third member may be disposed in a plane in which the joining part between the first member and the second member is positioned so that the third member and the second member planarly contact with each other in the press-fitting region.

According to this method, the bending strength can be increased in the press-fitting region, in particular. Since the third member planarly supports the second member in the press-fitting region, an effect of increasing the bending strength equivalent to that achieved with a configuration in which the second member has an increased plate thickness in the press-fitting region can be obtained.

The first member and the third member may be made of materials of the same kind, the third member may be disposed outside of the second member, and an insulation member may be interposed between the second member and the third member.

According to this method, electric corrosion between dissimilar metals can be prevented. Specifically, when the first member and the third member are made of materials of the same kind, electric corrosion between dissimilar metals does not occur between the first member and the third member. When the second member and the third member are made of materials of different kinds but adhesive agent is interposed between the second member and the third member, electric corrosion between these members can be prevented. In particular, when the first member and the second member are made of materials of different kinds and contact with each other at an end part, it is difficult to prevent electric corrosion by applying adhesive to the end part, and thus it is effective to prevent electric corrosion through the third member like the present method.

The third member may have a sheet shape and be wound around the second member.

Since the third member has a sheet shape, its application is not limited depending on the shape of the third member. Since the third member can be wound in an optional range, unnecessary weight increase due to disposition at a part unrelated to the joining strength can be prevented. In addition, the weight and the joining strength can be changed by changing the winding thickness, which leads to applicability.

The first member may have a hollow shape and include a second insertion hole, the third member may have a hollow shape, the third member may be inserted into the second insertion hole of the first member, and the second member may be expanded and deformed to be joined to the first member by the press-fitting.

According to this method, removing force and bending force applied to the second member are transferred to both of the first member and the third member, and thus the joining part has increased joining strength without concentration of the removing force and the bending force.

In addition, the third member may be expanded and deformed to be joined to the second member by the press-fitting.

According to this method, since the second member is joined to the first member by the press-fitting and the third member is joined to the second member by the press-fitting, the press-fit joining is performed at least at two places, thereby increasing the joining strength.

An insulation member may be disposed at least at one of gaps between the first member, the second member, and the third member, or at least at an end part of the first member, the second member, or the third member.

According to this method, the insulation member can prevent electric corrosion between dissimilar metals.

The first insertion hole of the first member may be similar to an outer shape of the second member.

According to this method, the expanding and deforming amount of the second member at press-fit joining can be minimized, and a load on the second member can be reduced, thereby preventing cracks and unintended deformation.

According to the present invention, in a joining method for a first member and a second member by press-fit joining, a third member is used to increase joining strength while suppressing increase in the weights of the members.

MODE FOR CARRYING OUT THE INVENTION

Embodiments of the present invention will be described below with the accompanying drawings.

Materials of individual members are exemplarily described below in embodiments, but are not particularly limited to those exemplarily described in the embodiments. The present invention is applicable to any optional material.

First Embodiment

Figure 1:
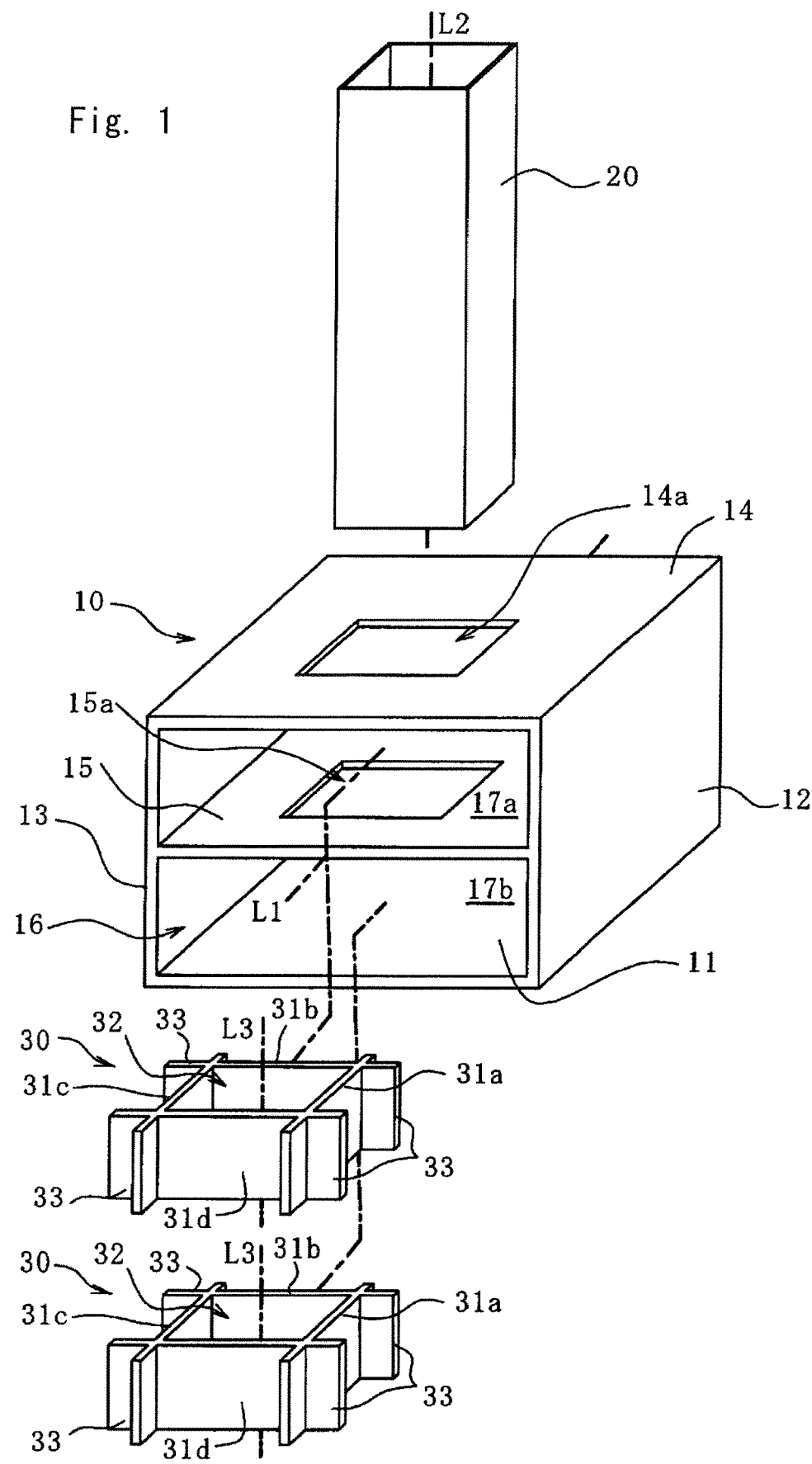
FIG. 1 is a perspective view illustrating a first member, a second member, and a third member according to a first embodiment of the present invention.

As illustrated in FIG. 1, a press-fit joining method according to the present embodiment joins a steel component (first member) 10 and an aluminum pipe (second member) 20. In this press-fit joining method, first, the steel component (first member) 10, the aluminum pipe (second member) 20, and a support component (third member) 30 are prepared.

The steel component 10 is a rectangular pipe made of high-tension steel and having an axis line L1 extending in the front-back direction in FIG. 1. The steel component 10 includes a horizontal bottom wall 11, two sidewalls 12 and 13 extending vertically upward the bottom wall 11, a horizontal top wall 14 connecting upper end parts of the two sidewalls 12 and 13, and a horizontal partition wall 15 connecting the two sidewalls 12 and 13 at middle between the bottom wall 11 and the top wall 14. The top wall 14 and the partition wall 15 are provided with rectangular insertion holes (first insertion holes) 14a and 15a, respectively. The insertion holes 14a and 15a overlap with each other in plan view. In other words, the insertion holes 14a and 15a are positioned with each other the horizontal direction. A space 17a having openings 16 at both ends is defined in the steel component 10 by the top wall 14, the sidewalls 12 and 13, and the partition wall 15. A space 17b having the openings 16 at both ends is defined in the steel component 10 by the partition wall 15, the sidewalls 12 and 13, and the bottom wall 11. Thus, the steel component 10 is formed so that a support component 30 can be inserted into the spaces 17a and 17b through the openings 16 as described later.

The aluminum pipe 20 according to the present embodiment is a rectangular pipe made of aluminum alloy, having a hollow shape, an axis line L2 extending in the vertical direction, and openings at both ends. No opening is provided to peripheral walls 20a, 20b, 20c, and 20d of the aluminum pipe 20. In plan view, the aluminum pipe 20 has an outer shape in a shape similar to the shapes of the insertion holes 14a and 15a and slightly smaller than the insertion holes 14a and 15a so that the aluminum pipe 20 can be inserted into the insertion holes 14a and 15a of the steel component 10.

The support component 30 includes four circumferential walls 31a to 31d made of aluminum alloy. The support component 30 has a hollow shape including an insertion hole 32 defined by the circumferential walls 31a to 31d at the center, and has an axis line L3 extending in parallel to the axis line L2 of the aluminum pipe 20. The support component 30 according to the present embodiment includes flanges 33 as extensions of the circumferential walls 31a to 31d outward from the insertion hole 32, and thus substantially has a pound key shape in plan view. The support component 30 has a height that allows its insertion between the bottom wall 11 and the partition wall 15 of the steel component 10 and between the partition wall 15 and the top wall 14 of the steel component 10.

Figure 2:
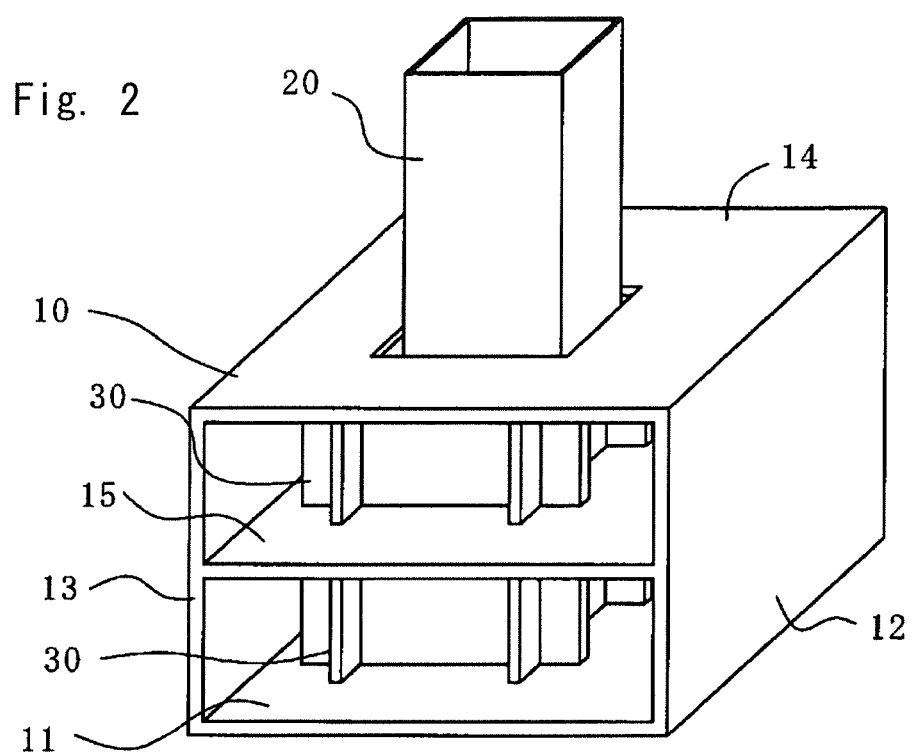
FIG. 2 is a perspective view of a combination of the first, second, and third members illustrated in FIG. 1.

As illustrated in FIG. 2, before joining, the steel component 10, the aluminum pipe 20, and the support component 30 are combined and disposed at a press machine (not illustrated) or the like. Specifically, first in sequential steps of the combination, the support components 30 are inserted between the bottom wall 11 and the partition wall 15 of the steel component 10 and between the partition wall 15 and the top wall 14 of the steel component 10, and disposed so that the insertion hole 32 of the support component 30 is positioned at the insertion holes 14a and 15a of the steel component 10 in plan view. Then, the aluminum pipe 20 is inserted into the insertion holes 14a and 15a of the steel component 10 and the insertion hole 32 of the support component 30 and placed on the bottom wall 11, which completes the combination before press-fit joining.

Figure 3:
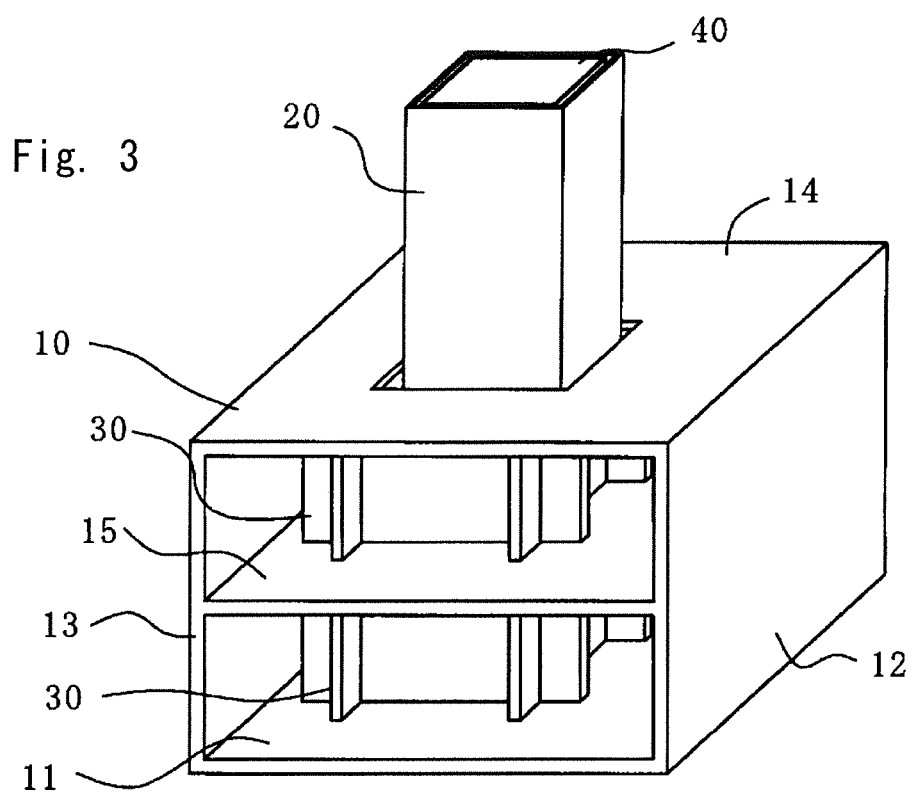
FIG. 3 is a perspective view of the combination illustrated in FIG. 2 before press-fit joining.

As illustrated in FIG. 3, an elastic member 40 is inserted into the aluminum pipe 20 when the steel component 10, the aluminum pipe 20, and the support component 30 in the combination are to be joined by the press-fitting. The elastic member 40 is made of a rubber material, and has a rectangular column shape extending in the vertical direction and having a dimension determined to allow insertion into the aluminum pipe 20.

Figure 4:
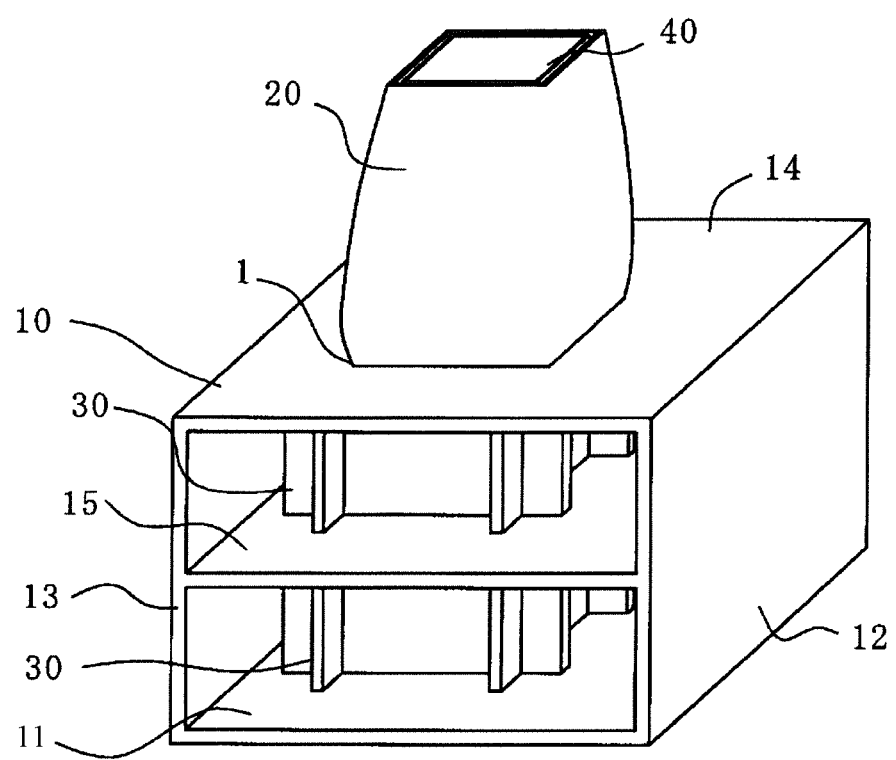
FIG. 4 is a perspective view of the combination illustrated in FIG. 2 after press-fit joining.

As illustrated in FIG. 4, when the elastic member 40 in the state illustrated in FIG. 3 is pressed downward by an indenter of the press device (not illustrated) or the like, the dimension of the elastic member 40 in the horizontal direction increases as the dimension of the elastic member 40 in the vertical direction decreases. Thus, the aluminum pipe 20 is expanded and deformed in the horizontal direction in accordance with elastic deformation (expansion) of the elastic member 40.

Figure 5:
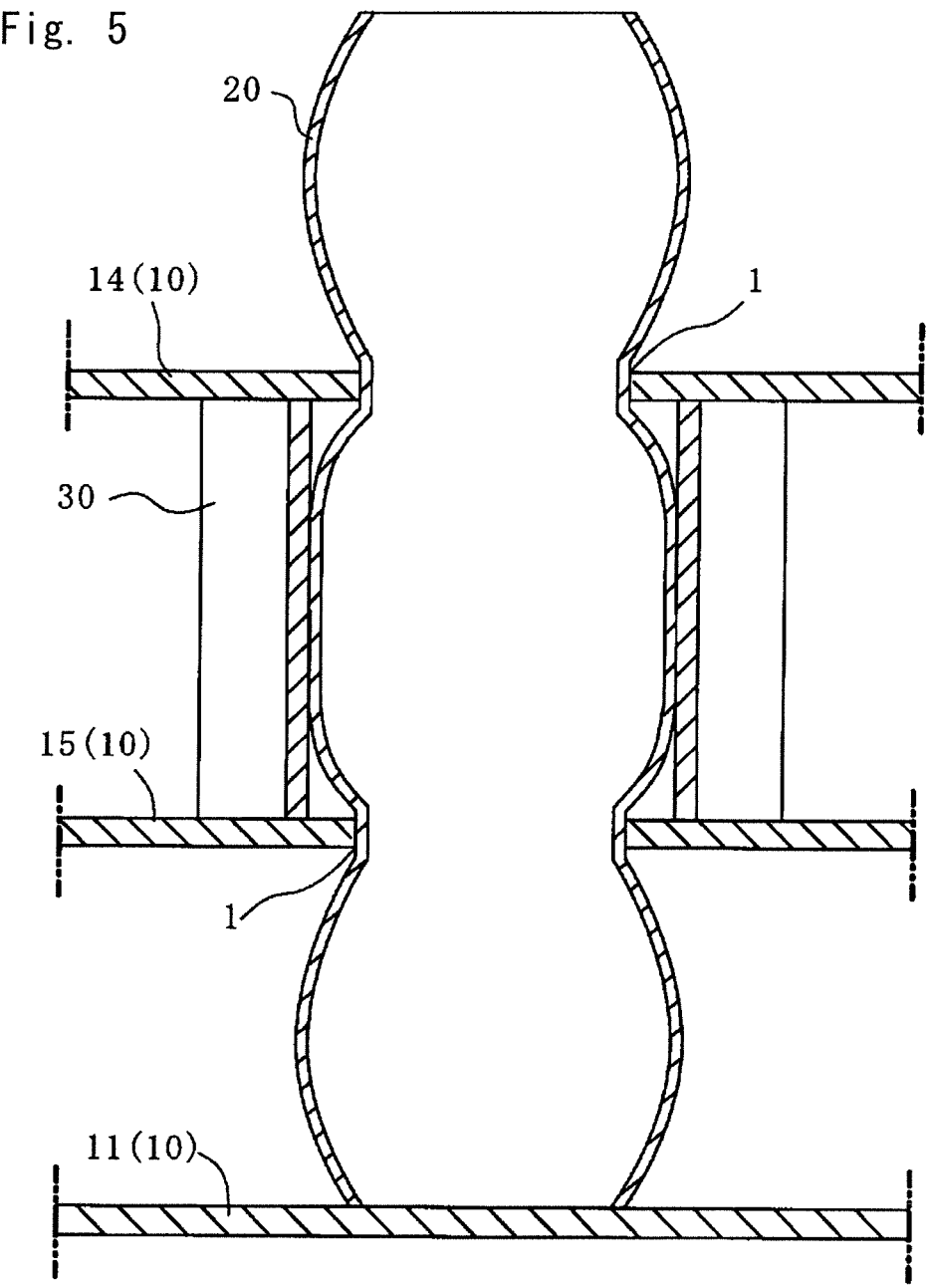
FIG. 5 is an enlarged cross-sectional view of a press-fitting region illustrated in FIG. 4.

In this manner, as illustrated in FIG. 5, the aluminum pipe 20 is expanded and deformed to be joined to the steel component 10 and each support component 30 by press-fitting. Part of the aluminum pipe 20 other than a joining part 1 to the steel component 10 bulges and is joined to the steel component 10 by press-fitting. The press-fit joining is performed while at least part of the support component 30 is disposed in a press-fitting region. The press-fitting region refers to the joining part 1 between the steel component 10 and the aluminum pipe 20 and the vicinity of the joining part 1. Thus, the aluminum pipe 20 deforms along the inner surface of the insertion hole 32 of the support component 30, and is joined to the support component 30 by press-fitting while being pressed toward the inner surface of the support component 30. The support component 30 is disposed adjacent to the joining part 1 between the steel component 10 and the aluminum pipe 20. In the present embodiment, one of the support components 30 is disposed in the corresponding press-fitting region so that the upper end surface of the support component 30 contacts with the lower surface of the top wall 14 of the steel component 10, and the lower end surface of the support component 30 contacts with the upper surface of the partition wall 15 of the steel component 10. The other support component 30 is disposed in the corresponding press-fitting region so that the upper end surface of the support component 30 contacts with the lower surface of the partition wall 15 of the steel component 10, and the lower end surface of the support component 30 contacts with the upper surface of the bottom wall 11 of the steel component 10.

According to the method of the present embodiment, joining strength can be increased in a joining method for members by press-fit joining while increase in the weights of the members is suppressed. The joining strength is a concept including pulling strength, bending strength, and fatigue strength. Specifically, each support component 30, which is disposed in the press-fitting region as described above, can function as an anti-removal member that prevents the aluminum pipe 20 from coming off the steel component 10, and function as a reinforcement member that reduces loads on the steel component 10 and the aluminum pipe 20. Thus, the joining strength can be increased without increasing the plate thicknesses of the steel component 10 and the aluminum pipe 20, and weight increase can be minimized since each support component 30 only needs to be disposed near the joining part 1.

When the aluminum pipe 20 and each support component 30 are further joined by press-fitting, the steel component 10, the aluminum pipe 20, and the support component 30 are integrally joined by press-fitting, thereby further increasing the joining strength.

Since each support component 30 also functions as a reinforcement member in the vicinity of the joining part 1, the bending strength and the fatigue strength are increased as well.

When removing force is applied to the aluminum pipe 20, the force is transferred from the aluminum pipe 20 through each support component 30 to a large region of the steel component 10 including the joining part 1 as compared to a configuration with no support component 30, which prevents stress concentration. Thus, deformation of the steel component 10 can be suppressed, and the aluminum pipe 20 can be more effectively prevented from coming off the steel component 10 along with the deformation.

In the present embodiment, the aluminum pipe 20 is expanded and deformed by using the elastic member 40, but this aspect is not particularly limited. Alternatively, the aluminum pipe 20 may be expanded and deformed by, for example, electromagnetic forming, or pipe expansion fabrication using a mandrel or a mold. This also applies to the following second to fourth embodiments.

The press-fit joining method according to the present embodiment may be applied to, for example, an automobile bumper member. Specifically, the steel component 10 is an automobile bumper member, the aluminum pipe 20 is a support pipe connected with the automobile bumper member, and each support component 30 is a reinforcement component used together with them.

Figure 6:
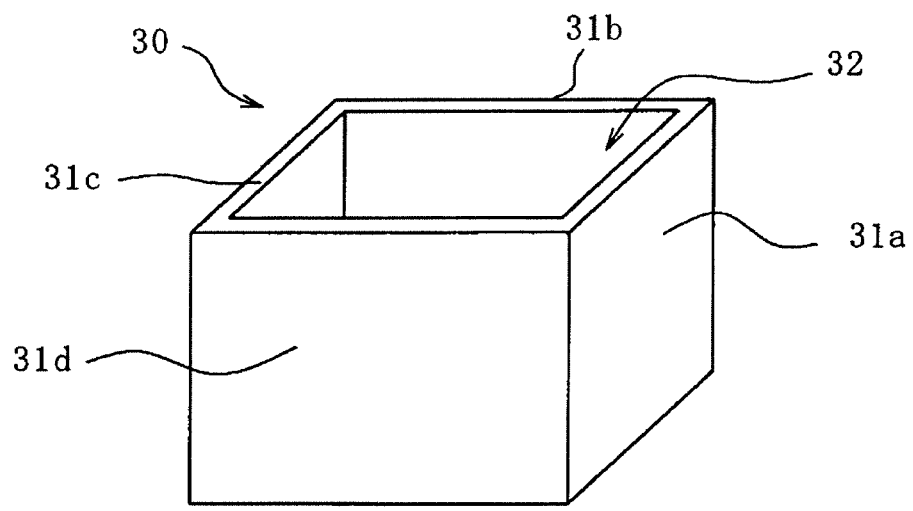
FIG. 6 is a perspective view of a first modification of the third member according to the first embodiment of the present invention.
Figure 7:
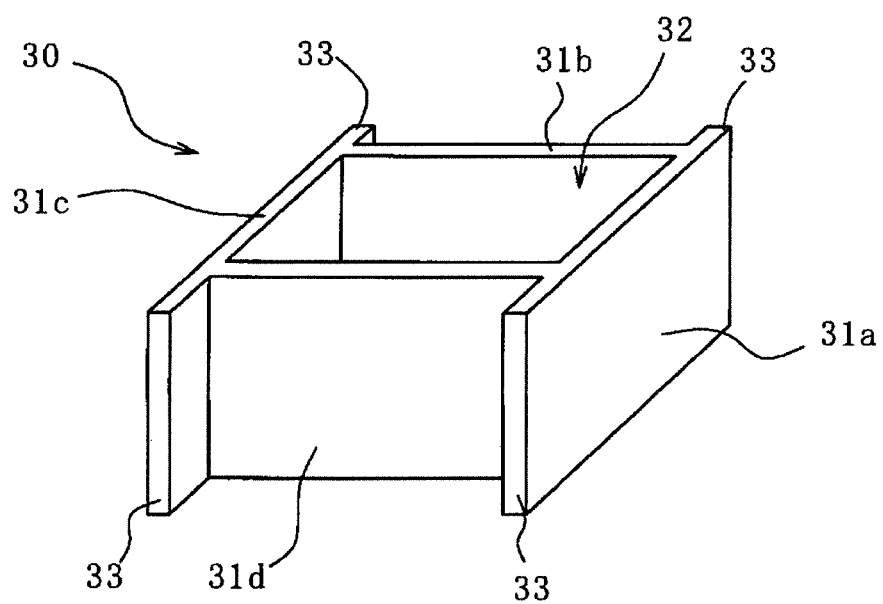
FIG. 7 is a perspective view of a second modification of the third member according to the first embodiment of the present invention.
Figure 8:
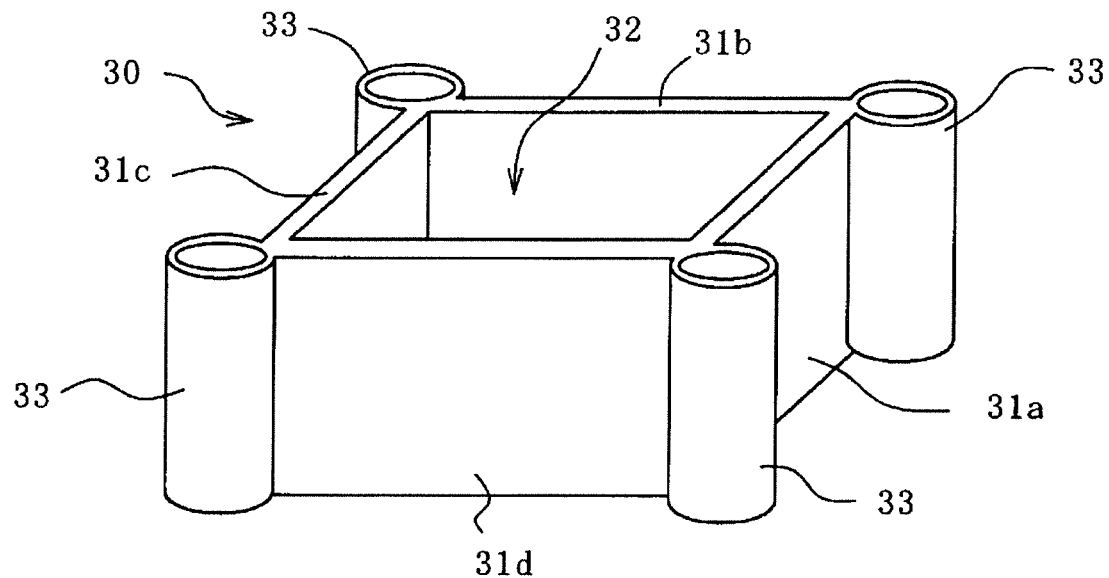
FIG. 8 is a perspective view of a third modification of the third member according to the first embodiment of the present invention.
Figure 9:
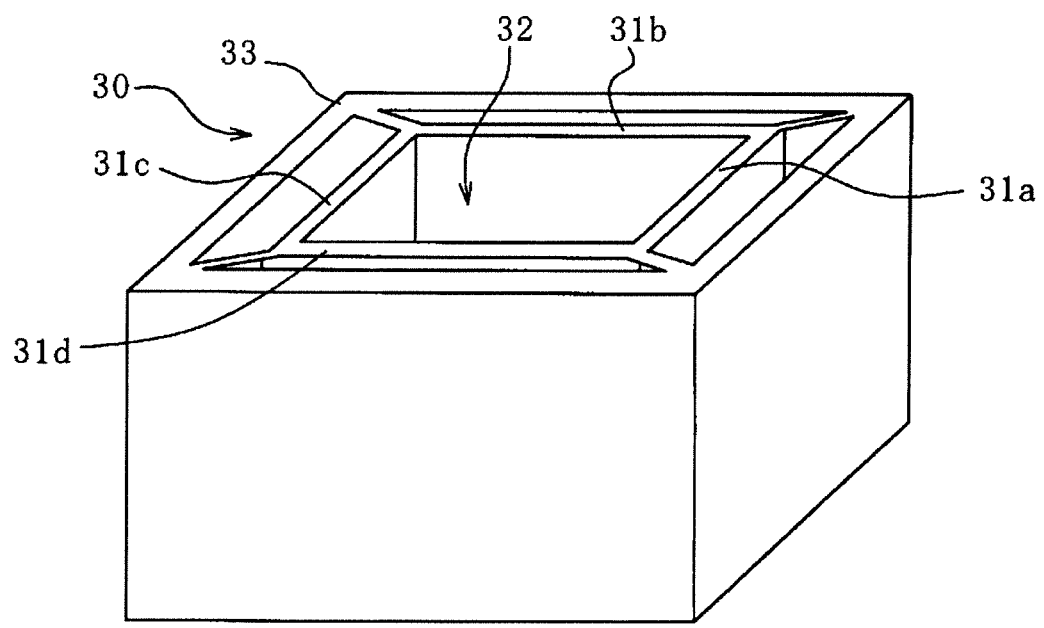
FIG. 9 is a perspective view of a fourth modification of the third member according to the first embodiment of the present invention.

Shapes illustrated in FIGS. 6 to 9 in plan view correspond to modifications of each support component 30 according to the present embodiment. FIG. 6 illustrates the support component 30 having a simple rectangular pipe shape including no flanges 33. FIG. 7 illustrates the support component 30 in which, among the four circumferential walls 31a to 31d forming the insertion hole 32, the two circumferential walls 31a and 31c include flanges 33 extending outward beyond the two circumferential walls 31b and 31d. FIG. 8 illustrates the support component 30 including circular flanges 33 at the corners of the four circumferential walls 31a to 31d forming the insertion hole 32. FIG. 9 illustrates the support component 30 in which concentric rectangular pipes similar to each other are connected with each other at the corners.

Second Embodiment

Figure 10:
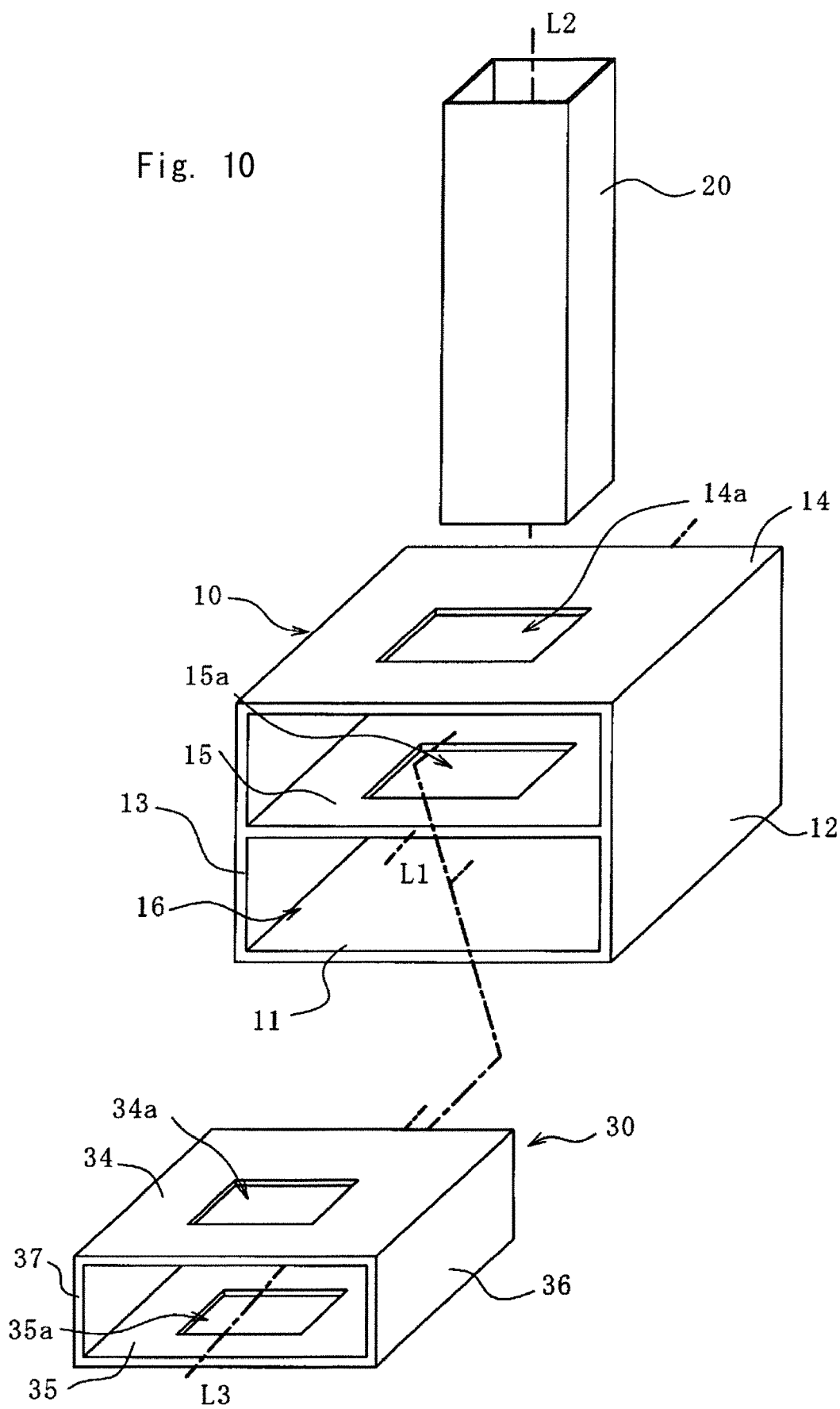
FIG. 10 is a perspective view illustrating the first, second, and third members according to a second embodiment of the present invention.

In a joining method according to the present embodiment illustrated in FIG. 10, any configuration other than a part related to each support component 30 is same as that of the first embodiment illustrated in FIGS. 1 to 5. Thus, any part same as that of the configuration illustrated in FIGS. 1 to 5 is denoted by the same reference sign, and description thereof will be omitted.

The support component 30 according to the present embodiment is a rectangular pipe disposed so that the axis line L3 extends in a direction (in the present embodiment, the front-back direction) different from the axis line L2 of the aluminum pipe 20. The support component 30 includes a horizontal upper wall 34, a horizontal lower wall 35, and two vertical sidewalls 36 and 37 connecting the upper and lower walls 34 and 35. The upper and lower walls 34 and 35 include rectangular insertion holes 34a and 35a, respectively. The rectangular insertion holes 34a and 35a are formed in shapes similar to the outer shape of the aluminum pipe 20 and slightly larger than the outer shape of the aluminum pipe 20 so that the aluminum pipe 20 can be inserted into the insertion holes 34a and 35a.

When the steel component 10, the aluminum pipe 20, and the support component 30 are combined, the support components 30 are respectively inserted between the bottom wall 11 and the partition wall 15 of the steel component 10 and between the partition wall 15 and the top wall 14 of the steel component 10, and disposed so that the insertion holes 14a and 15a of the steel component 10 are aligned with the insertion holes 34a and 35a of the support component 30 in plan view. Then, the aluminum pipe 20 is inserted into the insertion holes 14a and 15a of the steel component 10 and the insertion holes 34a and 35a of the support component 30, and placed on the bottom wall 11. In this state, similarly to the first embodiment, the aluminum pipe 20 is expanded and deformed by using an elastic member or the like to be joined to the steel component 10 and the support component 30 by press-fitting.

Figure 11:
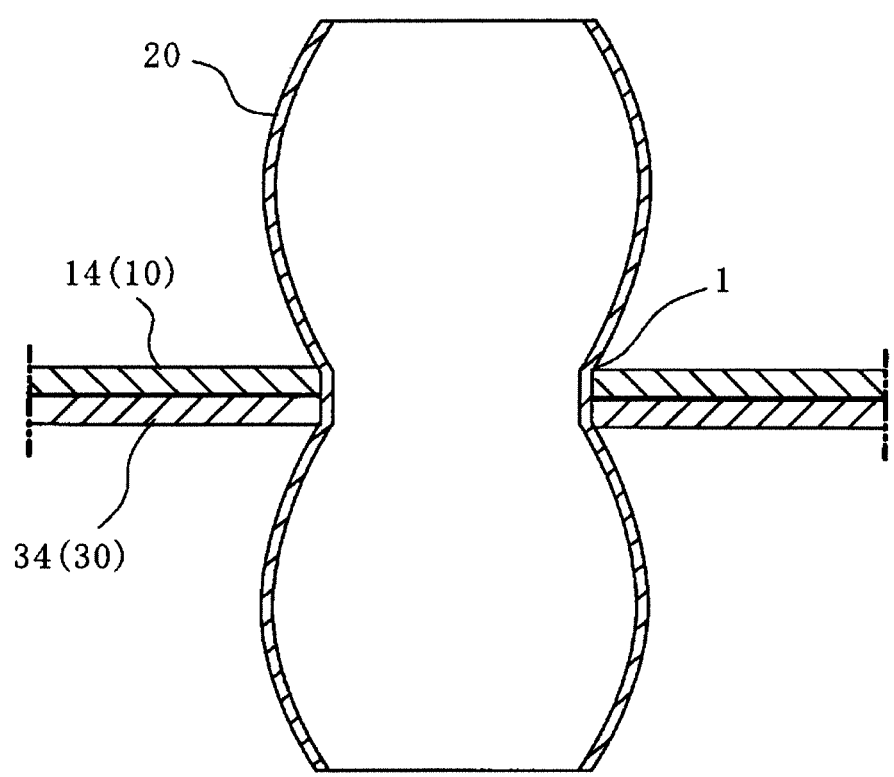
FIG. 11 is an enlarged cross-sectional view of the press-fitting region after press-fit joining according to the second embodiment of the present invention.

As illustrated in FIG. 11, the aluminum pipe 20 bulges at places other than the joining part 1 to the steel component 10 and the joining part 1 to the support component 30, and are joined to the steel component 10 and the support component 30 by press-fitting. In this state, the support component 30 and the steel component 10 planarly contact with each other in the press-fitting region.

According to the method according to the present embodiment, the bending strength can be increased in the press-fitting region, in particular. Since the support component 30 planarly supports the steel component 10 in the press-fitting region, an effect of increasing the bending strength, which is equivalent to that achieved with a configuration in which the steel component 10 has an increased plate thickness in the press-fitting region can be obtained.

Figure 12:
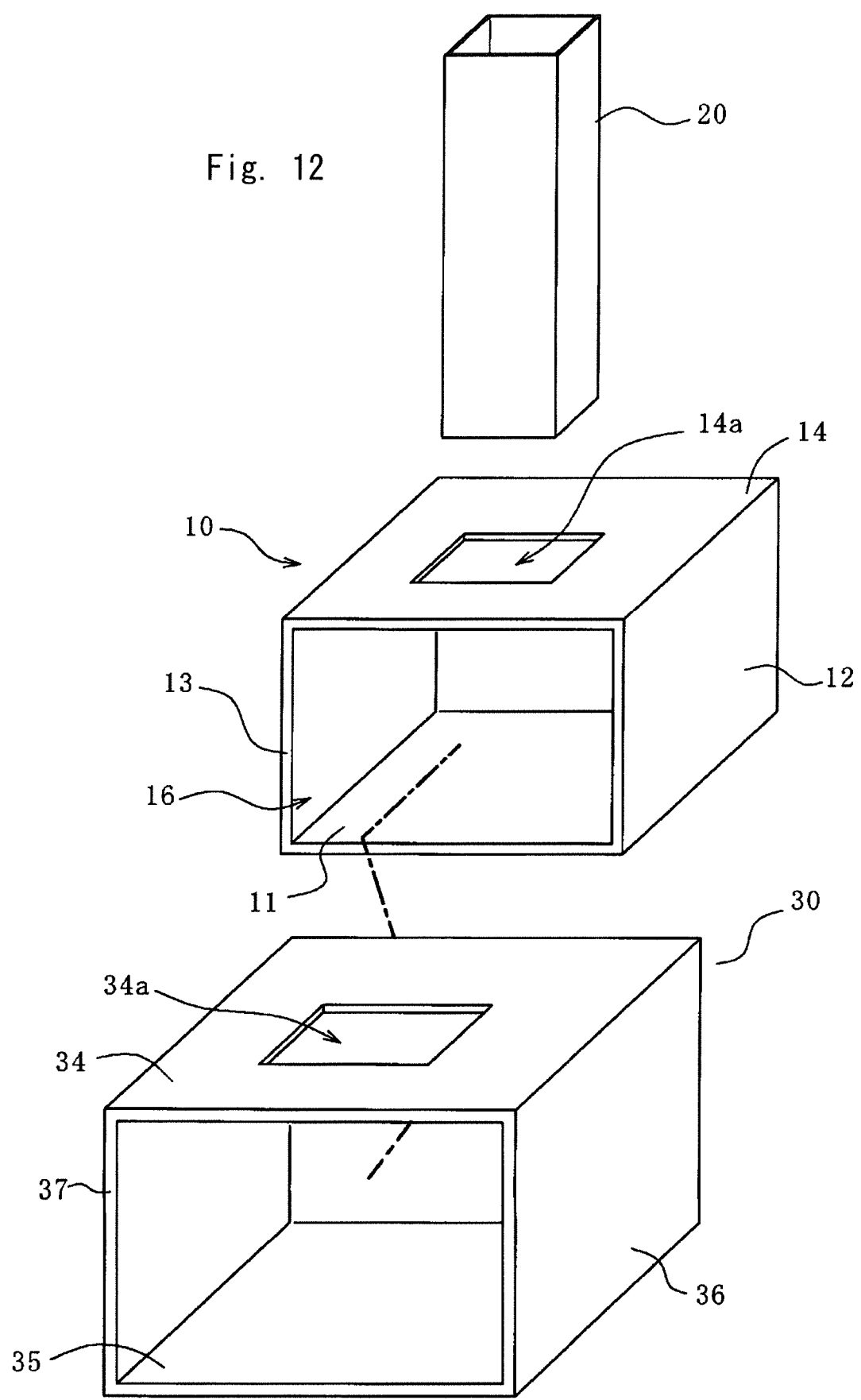
FIG. 12 is a perspective view illustrating a modification of the second embodiment of the present invention.

The configuration of the present embodiment is not limited to the configuration illustrated in FIG. 10, but the support component 30 may be disposed outside the steel component 10 as illustrated in FIG. 12. In this case, the steel component 10 preferably includes no partition wall 15. This is because the support component 30 and the steel component 10 need to planarly contact with each other in the press-fitting region when the support component 30 is used to reinforce the steel component 10 as described above, but the support component 30 cannot contact with a partition wall inside the steel component 10 when the support component 30 is disposed outside the steel component 10.

Figure 13:
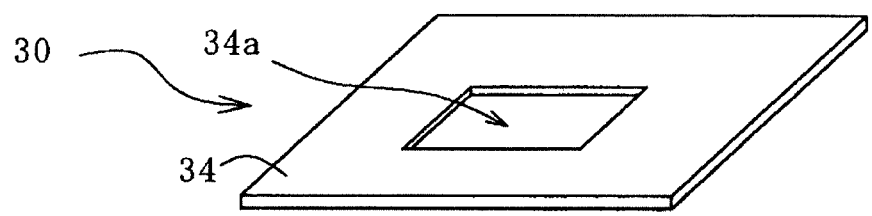
FIG. 13 is a perspective view illustrating a first modification of the third member according to the second embodiment of the present invention.
Figure 14:
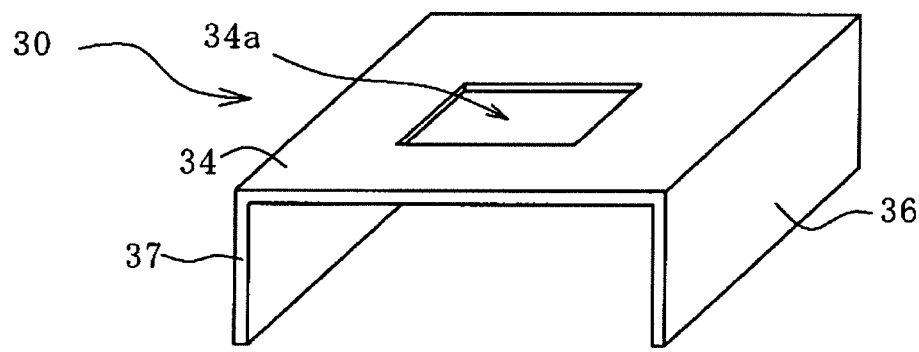
FIG. 14 is a perspective view illustrating a second modification of the third member according to the second embodiment of the present invention.
Figure 15:
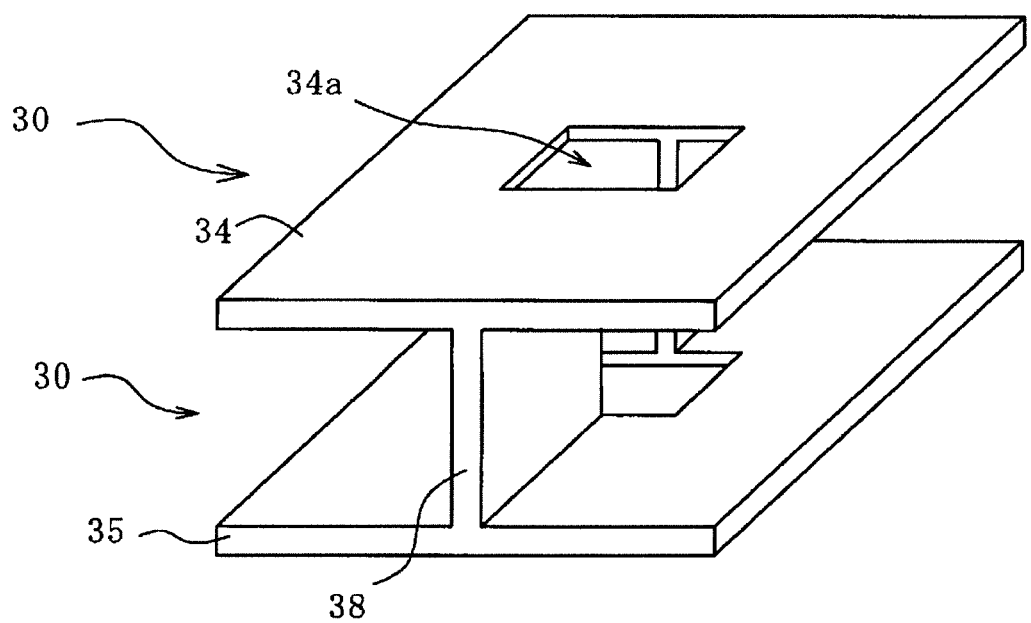
FIG. 15 is a perspective view illustrating a third modification of the third member according to the second embodiment of the present invention.
Figure 16:
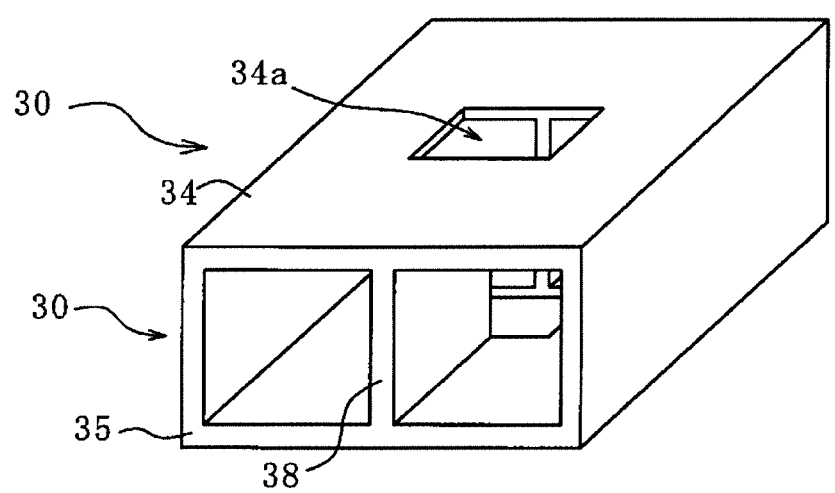
FIG. 16 is a perspective view illustrating a fourth modification of the third member according to the second embodiment of the present invention.
Figure 17:
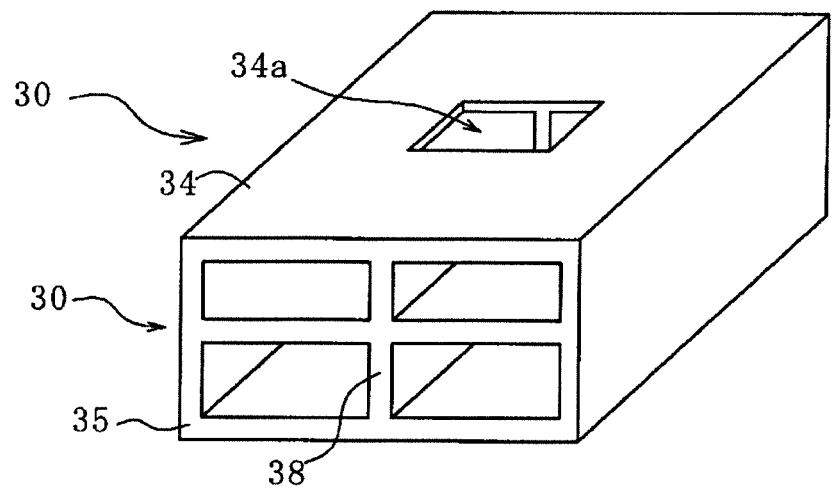
FIG. 17 is a perspective view illustrating a fifth modification of the third member according to the second embodiment of the present invention.
Figure 18:
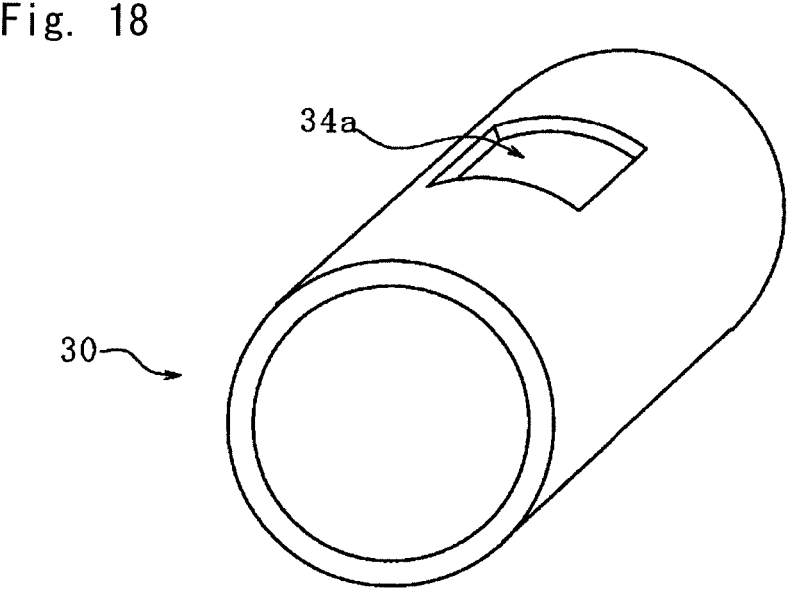
FIG. 18 is a perspective view illustrating a sixth modification of the third member according to the second embodiment of the present invention.

Shapes illustrated in FIGS. 13 to 18 in front view correspond to modifications of the support component 30 according to the present embodiment. FIG. 13 illustrates a plate support component 30 only including the upper wall 34. FIG. 14 illustrates a channel-shaped support component 30 further including the sidewalls 36 and 37. FIG. 15 illustrates an H-shaped support component 30 including the upper wall 34, the lower wall 35, and a middle wall 38 connecting the walls at the center in the longitudinal direction. FIG. 16 illustrates a support component 30 further including a middle wall 39 extending in the lateral direction at the center in addition to the H-shaped support component 30 illustrated in FIG. 15. FIG. 17 illustrates a support component 30 including the middle wall 38 connecting the upper and lower walls 34 and 35 of the rectangular support component 30 at the center in the longitudinal direction, and the middle wall 39 connecting the sidewalls 36 and 37 at the center in the lateral direction. FIG. 18 illustrates a circular support component 30. When the circular support component 30 is used, the top wall 14, the partition wall 15, and the bottom wall 11 of the steel component 10 need to have curved shapes corresponding to each other. Such a modification includes a case in which the support component 30 has no point symmetric structure, and the axis line L3 (refer to FIG. 10) cannot be accurately defined. In such a case, the axis line L3 is defined so that the axis line L3 passes through a barycenter.

Third Embodiment

Figure 19:
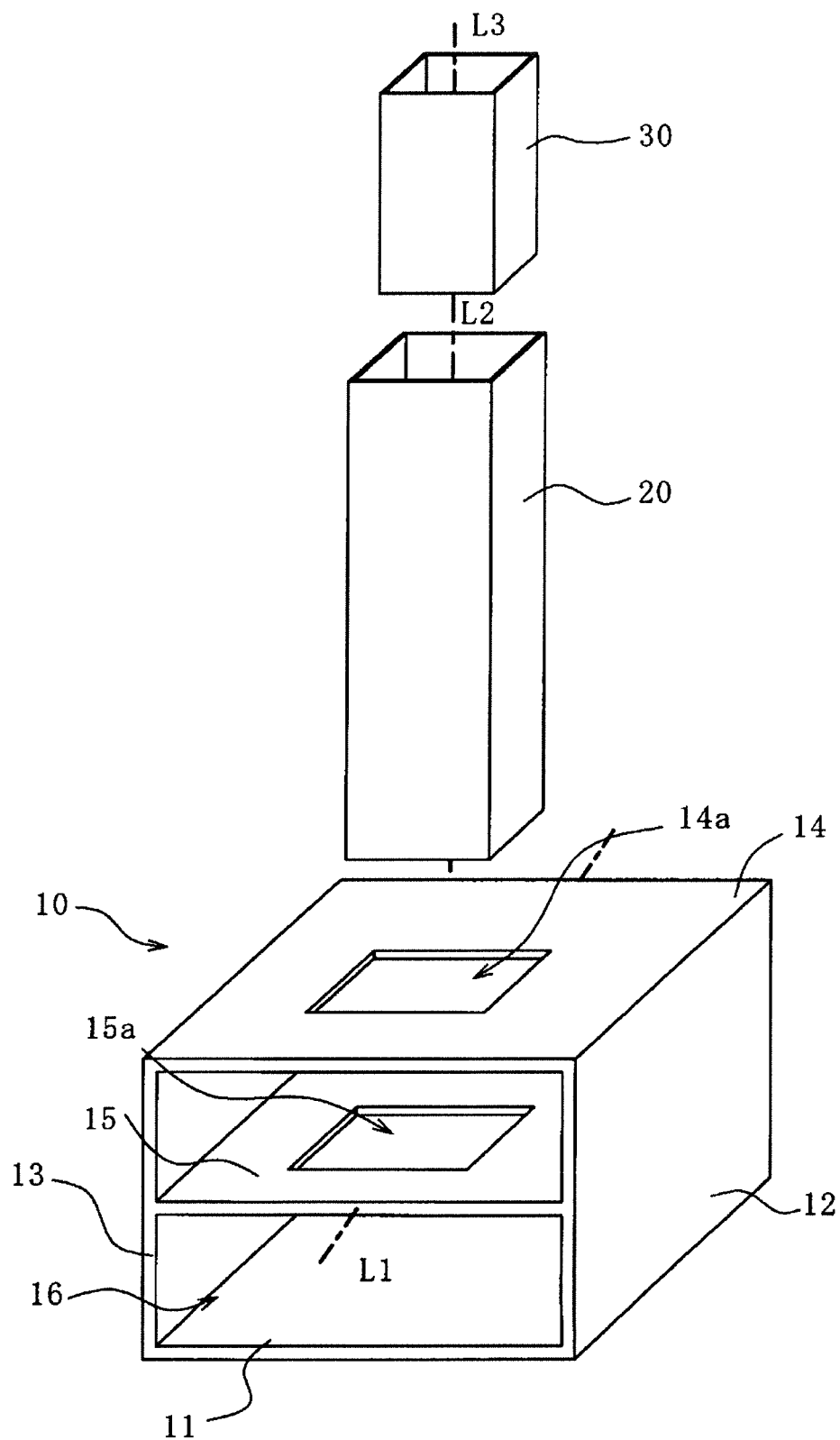
FIG. 19 is a perspective view illustrating the first, second, and third members according to a third embodiment of the present invention.

In a joining method according to the present embodiment illustrated in FIG. 19, any configuration other than a part related to the support component 30 is same as that of the first embodiment illustrated in FIGS. 1 to 5. Thus, any part same as that of the configuration illustrated in FIGS. 1 to 5 is denoted by the same reference sign, and description thereof will be omitted.

The support component 30 according to the present embodiment is a rectangular pipe disposed so that the axis line L3 extends in a direction parallel to (in the present embodiment, aligned with) the axis line L2 of the aluminum pipe 20. The support component 30 has a rectangular outer shape similar to the inner shape of the aluminum pipe 20 and slightly smaller than the inner shape of the aluminum pipe 20 so that support component 30 can be inserted into the aluminum pipe 20.

Figure 20:
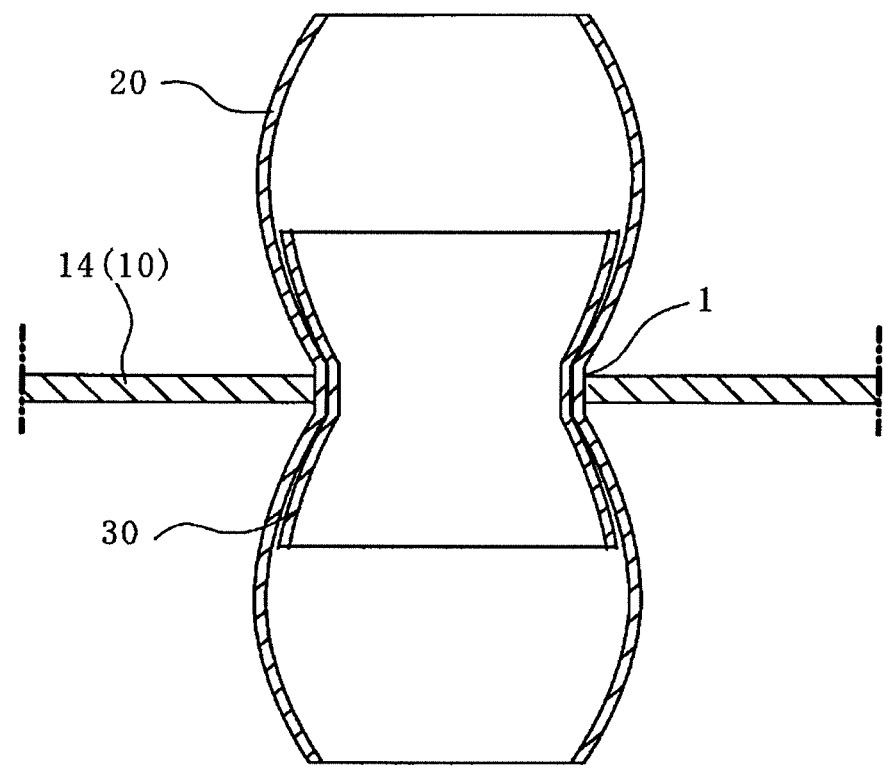
FIG. 20 is an enlarged cross-sectional view of a joining part after press-fit joining illustrated in FIG. 19.

As illustrated in FIG. 20, at least part of the support component 30 is disposed in a plane in which the joining part 1 between the steel component 10 and the aluminum pipe 20 is positioned, and the support component 30 and the aluminum pipe 20 planarly contact with each other in the press-fitting region. The support component 30 is deformed along the aluminum pipe 20, and is expanded and deformed and joined to the steel component 10 by press-fitting together with the aluminum pipe 20.

According to the method according to the present embodiment, the bending strength can be increased in the press-fitting region, in particular. Since the support component 30 planarly supports the aluminum pipe 20 in the press-fitting region, an effect of increasing the bending strength, which is equivalent to that achieved with a configuration in which the aluminum pipe 20 has an increased plate thickness in the press-fitting region can be obtained.

Figure 21:
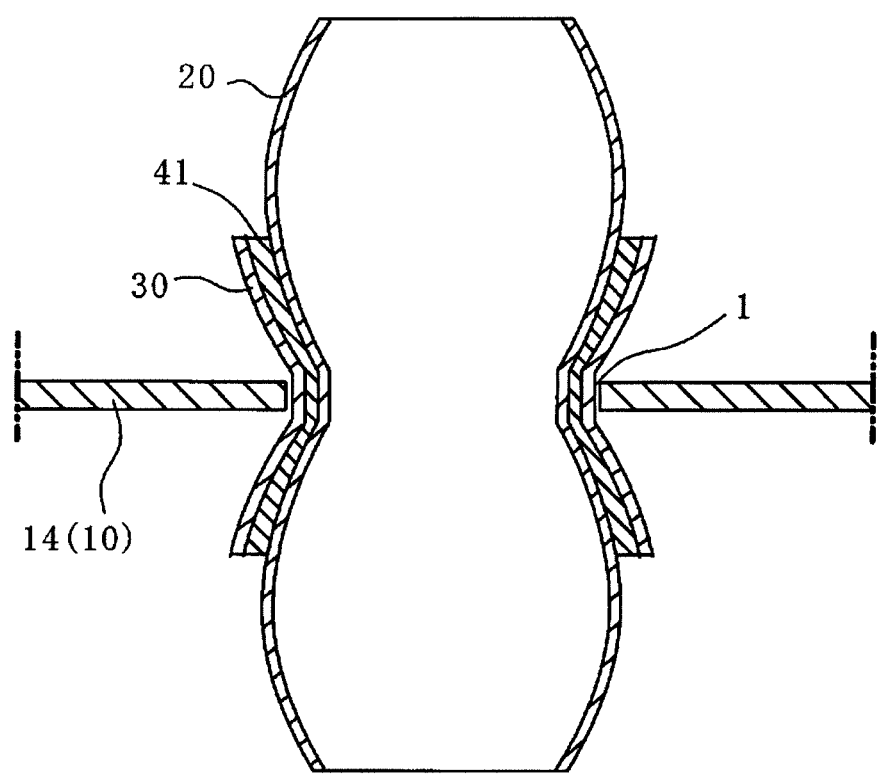
FIG. 21 is an enlarged cross-sectional view of the joining part according to a first modification of the third embodiment of the present invention.
Figure 22:
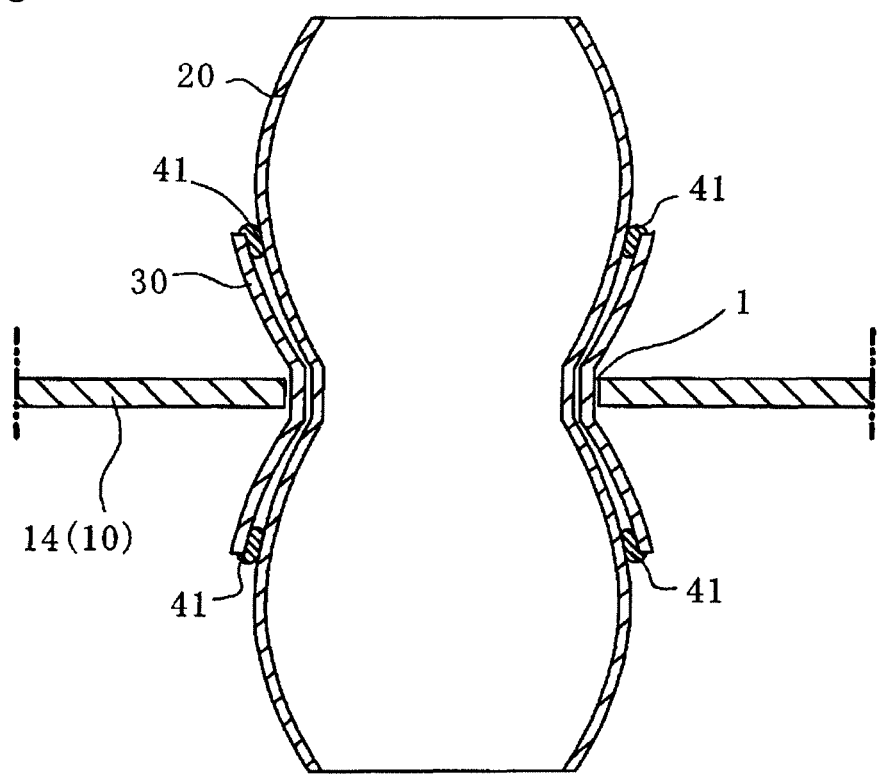
FIG. 22 is an enlarged cross-sectional view of the joining part according to a second modification of the third embodiment of the present invention.

As illustrated in FIG. 21, according to a modification of the present embodiment, the support component 30 may be disposed outside of the aluminum pipe 20. Specifically, the support component 30 may be disposed between the steel component 10 and the aluminum pipe 20. In this case, it is preferable that the steel component 10 and the support component 30 are made of materials of the same kind (for example, high-tension steel), and insulation adhesive agent (insulation member) 41 is interposed between the aluminum pipe 20 and the support component 30. The adhesive agent 41 only needs to be insulative, and is not limited to a particular kind. For example, the adhesive agent 41 may be foaming agent. As illustrated in FIG. 22, the adhesive agent 41 may be disposed only at end parts of the support component 30.

In the method of according to the present modification, electric corrosion between dissimilar metals can be prevented. Specifically, when the steel component 10 and the support component 30 are made of materials of the same kind, electric corrosion between dissimilar metals does not occurs between the steel component 10 and the support component 30. Since the aluminum pipe 20 and the support component 30 made of materials of different kinds but the adhesive agent 41 is interposed between the aluminum pipe 20 and the support component 30, electric corrosion therebetween can be prevented. In particular, when the steel component 10 and the aluminum pipe 20 are made of materials of different kinds and contact with each other at an end part, it is difficult to prevent electric corrosion by applying adhesive to the end part, and thus it is effective to prevent electric corrosion through the support component 30 like the present method. In addition, when the adhesive agent 41 is disposed not in the entire gap between the aluminum pipe 20 and the support component 30 but at an end part of the support component 30 to seal the gap (refer to FIG. 22), ingress of water and air into the gap can be prevented, and thus electric corrosion can be prevented.

Figure 23:
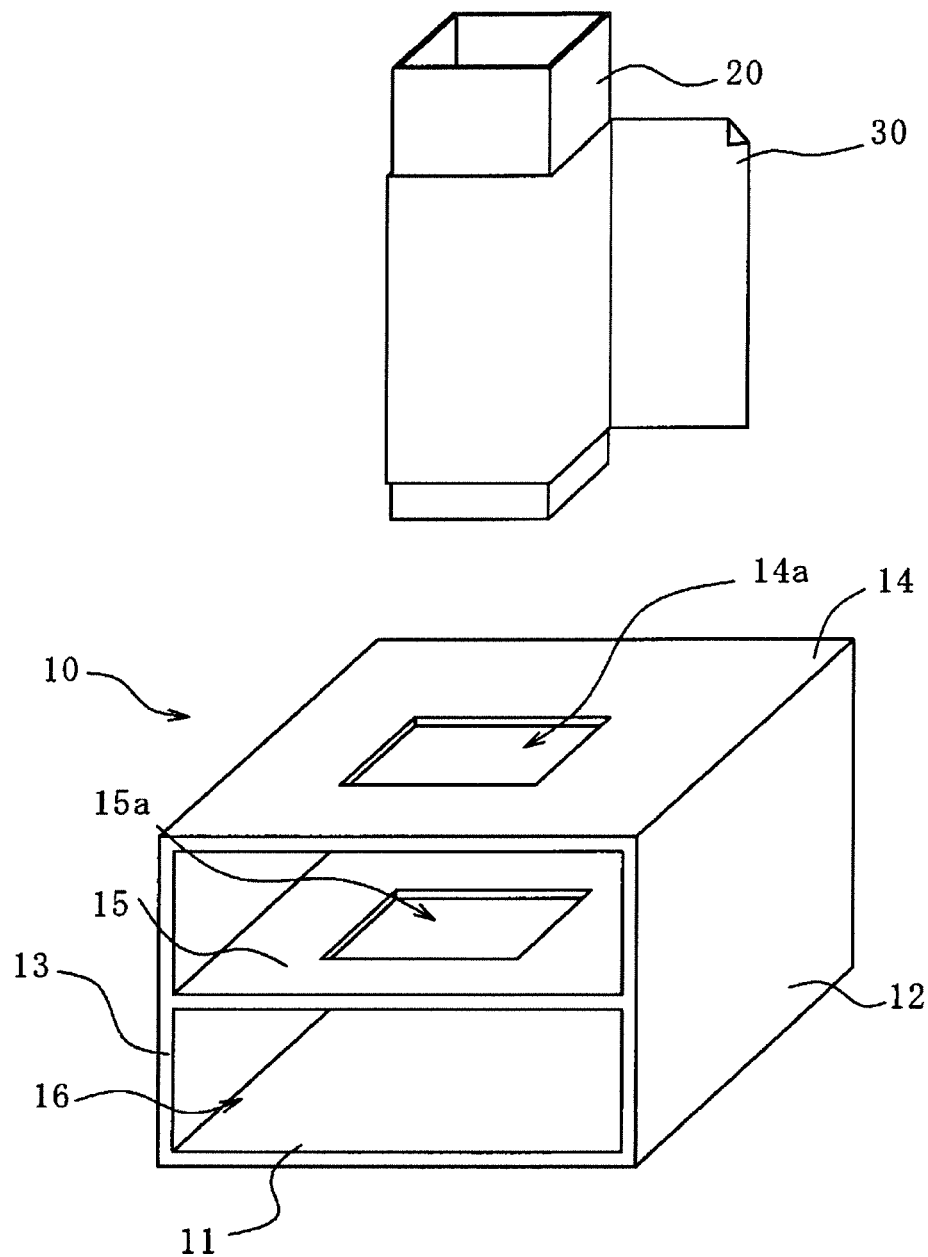
FIG. 23 is a perspective view illustrating the first, second, and third members according to a third modification of the third embodiment of the present invention.
Figure 24:
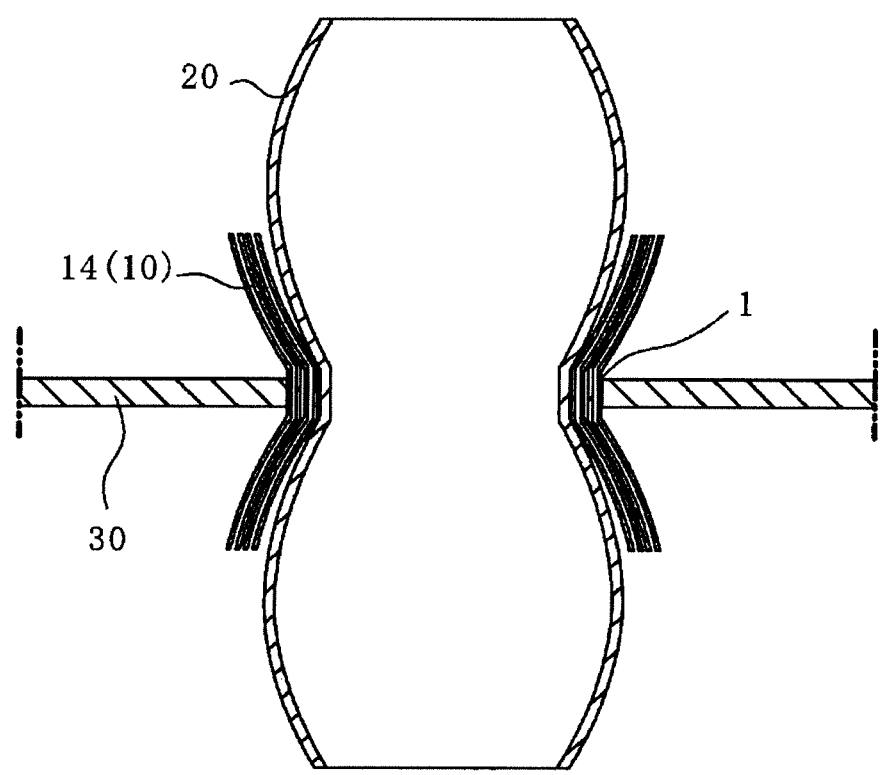
FIG. 24 is an enlarged cross-sectional view of the joining part after press-fit joining illustrated in FIG. 23.

According to another modification of the present embodiment, the support component 30 may have a sheet shape and be wound around the aluminum pipe 20 and joined by press-fitting as illustrated in FIGS. 23 and 24.

Since the support component 30 has a sheet shape, its application is not limited depending on the shape of the support component 30. Since the support component 30 can be wound in an optional range, unnecessary weight increase due to disposition at a part unrelated to the joining strength can be prevented. In addition, the weight and the joining strength can be changed by changing the winding thickness, which leads to applicability.

Fourth Embodiment

Figure 25:
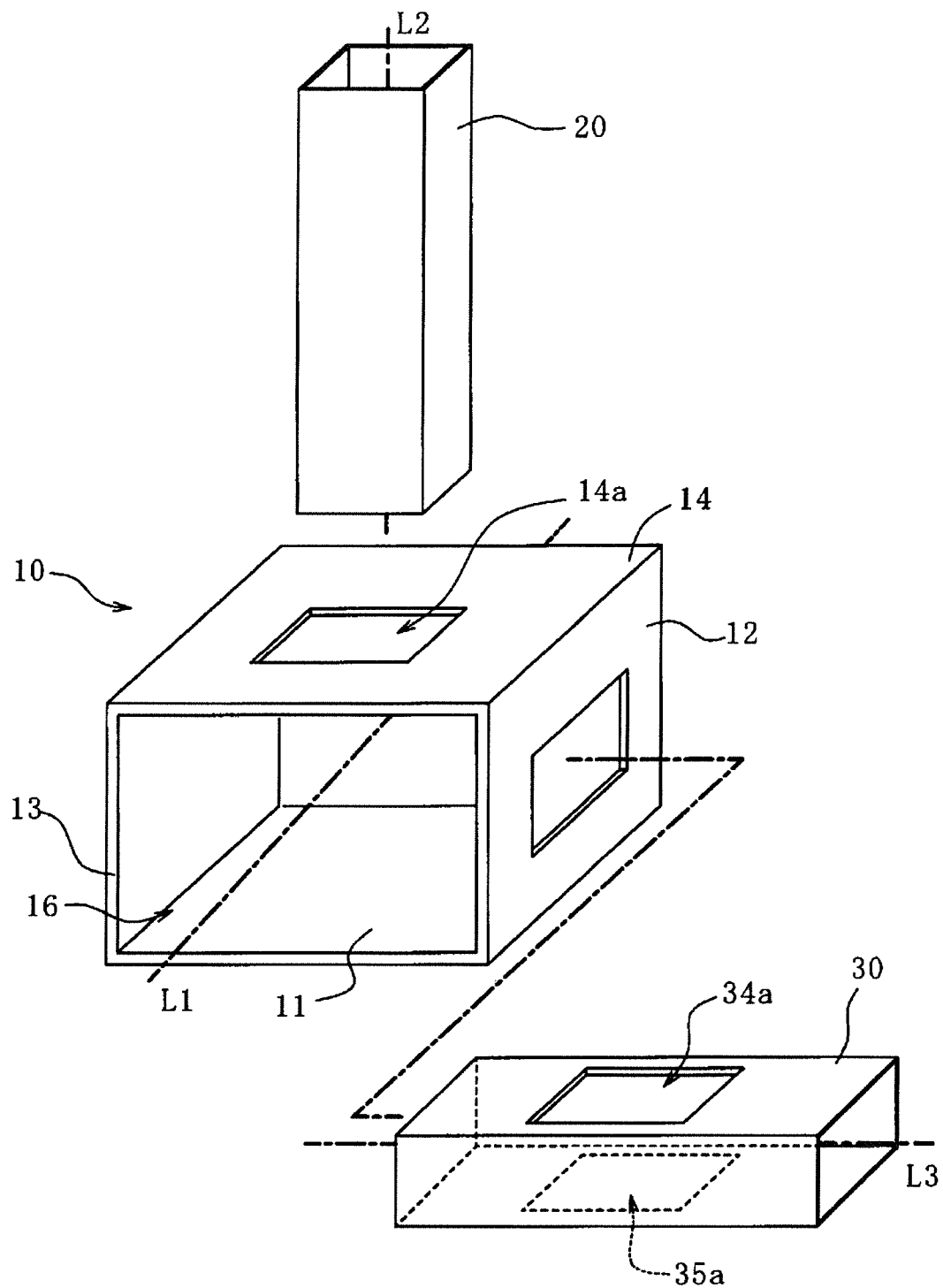
FIG. 25 is a perspective view illustrating the first, second, and third members according to a fourth embodiment of the present invention.
Figure 26:
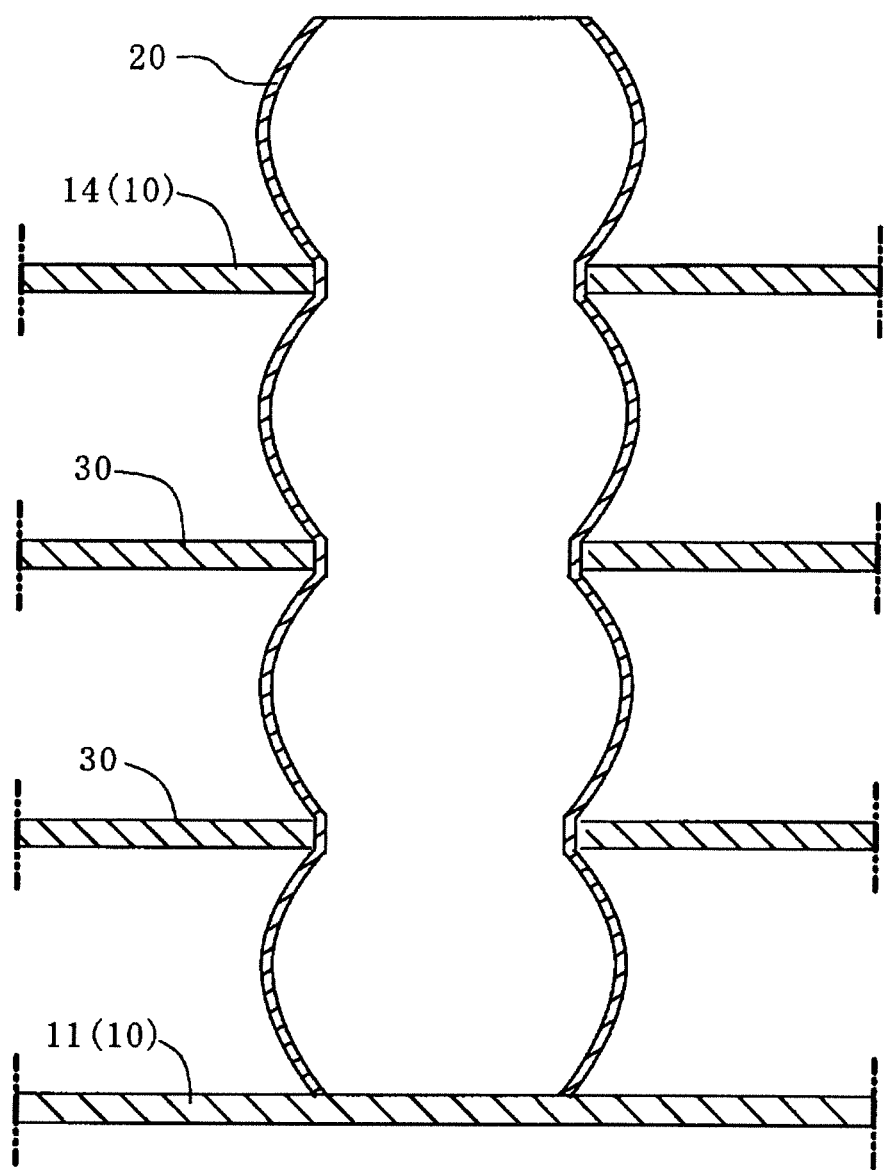
FIG. 26 is an enlarged cross-sectional view of the joining part after press-fit joining illustrated in FIG. 25.

In a joining method according to the present embodiment illustrated in FIGS. 25 and 26, any configuration other than a part related to a direction in which the support component 30 is inserted is same as that of the second embodiment illustrated in FIGS. 10 to 11. Thus, any part same as the configuration illustrated in FIGS. 10 to 11 is denoted by the same reference sign, and description thereof will be omitted.

The steel component 10 according to the present embodiment has a hollow shape and includes, at the sidewall 12, an insertion hole (second insertion hole) 12a through which the support component 30 is inserted. In the present embodiment, a partition wall is not provided to the steel component 10, but may be provided.

The support component 30 according to the present embodiment is a rectangular pipe having a hollow shape. The support component 30 is disposed so that the axis line L3 extends in a direction (in the present embodiment, direction orthogonal to the axis lines L1 and L2) different from the axis line L1 of the steel component 10 and the axis line L2 of the aluminum pipe. The support component 30 includes, at the upper wall 34 and the lower wall 35, the insertion holes 34a and 35a having rectangular shapes similar to the outer shape of the aluminum pipe 20 and slightly larger than the outer shape of the aluminum pipe 20 so that the aluminum pipe 20 can be inserted through the holes. At joining, the support component 30 is inserted into the steel component 10, and the aluminum pipe 20 is inserted into the steel component 10 and the support component 30, and then these components are joined by press-fitting. Specifically, the support component 30 is inserted into the insertion hole 14a of the steel component 10, the aluminum pipe 20 is inserted into the insertion hole 14a of the steel component 10 and the insertion holes 34a and 35a of the support component 30, and the aluminum pipe 20 is expanded and deformed to be joined to the steel component 10 and the support component 30 by press-fitting.

In the method according to the present embodiment, removing force and bending force applied to the aluminum pipe 20 are transferred to both of the steel component 10 and the support component 30, and thus the joining part 1 has increased joining strength without concentration of the removing force and the bending force.

Figure 27:
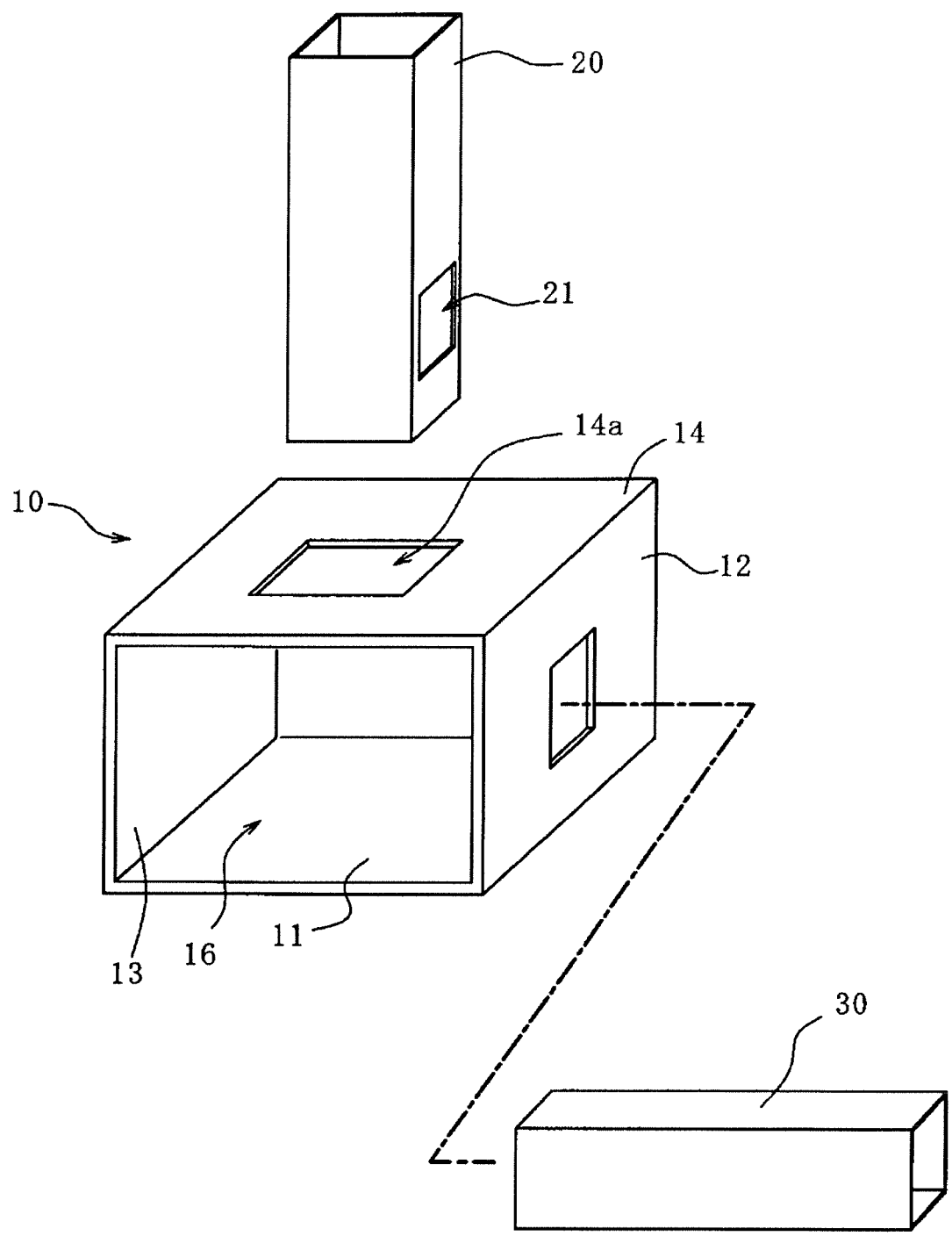
FIG. 27 is a perspective view illustrating the first, second, and third members according to a modification of the fourth embodiment of the present invention.
Figure 28:
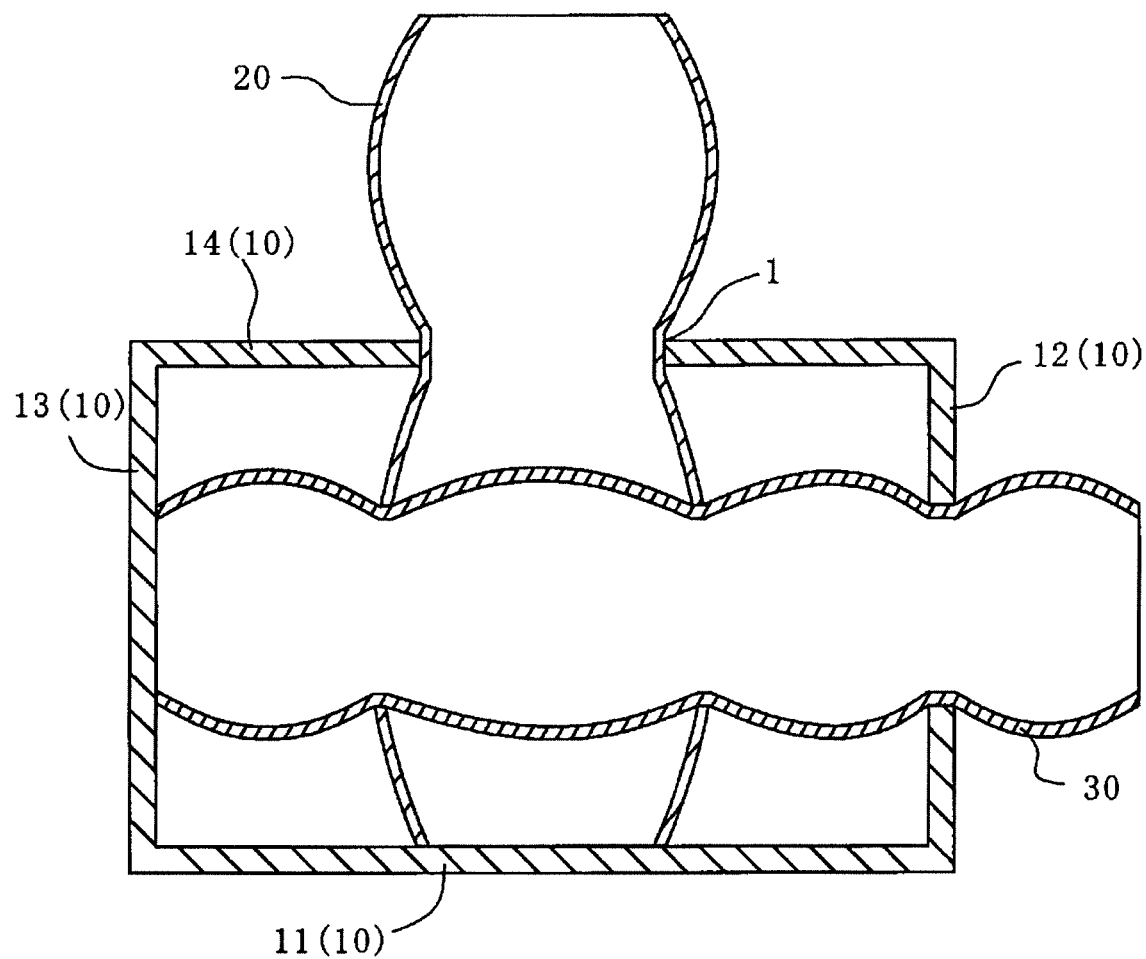
FIG. 28 is an enlarged cross-sectional view of the joining part after press-fit joining illustrated in FIG. 27.

As illustrated in FIGS. 27 and 28, according to a modification of the present embodiment, the support component 30 may include no insertion hole. In this case, the aluminum pipe 20 includes an insertion hole 21 through which the support component 30 inserted. At joining, the aluminum pipe 20 is inserted into the steel component 10, the support component 30 is inserted into the steel component 10 and the aluminum pipe 20, and then these components are joined by press-fitting. Specifically, in a joining method according to the present modification, first, the aluminum pipe 20 is inserted into the insertion hole 14a of the steel component 10, expanded and deformed to be joined to the steel component 10 by press-fitting. Subsequently, the support component 30 is inserted into the insertion hole 14a of the steel component 10 and the insertion hole 21 of the aluminum pipe 20, expanded and deformed to be joined to the steel component 10 and the aluminum pipe 20 by press-fitting.

In the method according to the present modification, since the aluminum pipe 20 is joined to the steel component 10 by press-fitting and the support component 30 is joined to the aluminum pipe 20 by press-fitting, the press-fit joining is performed at least at two places, thereby increasing the joining strength.

In the first to fourth embodiments, the adhesive agent 41 is preferably used between dissimilar metallic materials as illustrated in FIGS. 21 and 22. Specifically, when the steel component (first member) 10, the aluminum pipe (second member) 20, and the support component (third member) 30 are formed of dissimilar materials, adhesive agent (insulation member) for sealing a gap between dissimilar materials is preferably disposed at least at one of gaps between dissimilar materials or at least at one member end part. Accordingly, the adhesive agent (insulation member) prevents electric corrosion between dissimilar metals.

In the first to fourth embodiments, the insertion holes 14a and 15a of the steel component 10 are preferably similar to the outer shape of the aluminum pipe 20. In the present embodiment, the insertion holes 14a and 15a and the aluminum pipe 20 have rectangular shapes and thus similar to each other, but the present invention is not limited thereto. The insertion holes 14a and 15a and the aluminum pipe 20 may have similar shapes such as polygons or circular shapes. Accordingly, the expanding and deforming amount of the aluminum pipe 20 at press-fit joining can be minimized, and a load on the aluminum pipe 20 can be reduced, thereby preventing cracks and unintended deformation.

The invention claimed is:

1. A joining method for members, comprising:
providing a first member having a first insertion hole, a second member having a hollow shape, and a third member;
inserting the second member into the first insertion hole of the first member in an insertion direction; and
expanding and deforming the second member to join the second member to the first member by press-fitting by,
  inserting an elastic member into the hollow shape of the second member, and
  pressing the elastic member in the insertion direction,
wherein the press-fit joining is performed while at least part of the third member is disposed in a press-fitting region.

2. The joining method for members according to claim 1, wherein the second member and the third member are further joined to each other by the press-fitting.

3. The joining method for members according to claim 1, wherein the third member is disposed adjacent to a joining part between the first member and the second member.

4. The joining method for members according to claim 1, wherein
the third member has a hollow shape including an insertion hole,
the third member is disposed so that an axis line of the third member extends in parallel to an axis line of the second member, and
the second member is inserted into the insertion hole of the third member and joined to the third member by the press-fitting.

5. The joining method for members according to claim 1, wherein the third member is disposed so that the third member and the first member planarly contact with each other in the press-fitting region and an axis line of the third member extends in a direction different from an axis line of the second member.

6. The joining method for members according to claim 1, wherein at least part of the third member is disposed in a plane in which a joining part between the first member and the second member is positioned so that the third member and the second member planarly contact with each other in the press-fitting region.

7. The joining method for members according to claim 6, wherein
the first member and the third member are made of materials of the same kind,
the third member is disposed outside the second member, and
an insulation member is interposed between the second member and the third member.

8. The joining method for members according to claim 6, wherein
the third member has a sheet shape, and
the third member is wound around the second member.

9. The joining method for members according to claim 1, wherein
the first member has a hollow shape and includes a second insertion hole,
the third member has a hollow shape,
the third member is inserted into the second insertion hole of the first member, and
the third member is expanded and deformed to be joined to the first member by the press-fitting.

10. The joining method for members according to claim 9, wherein the third member is further expanded and deformed to be joined to the second member by the press-fitting.

11. The joining method for members according to claim 1, wherein an insulation member is disposed at least at one of gaps between the first member, the second member, and the third member, or at least at an end part of the first member, the second member, or the third member.

12. The joining method for members according to claim 2, wherein the third member is disposed adjacent to a joining part between the first member and the second member.

13. The joining method for members according to claim 2, wherein
the third member has a hollow shape including an insertion hole,
the third member is disposed so that an axis line of the third member extends in parallel to an axis line of the second member, and
the second member is inserted into the insertion hole of the third member and joined to the third member by the press-fitting.

14. The joining method for members according to claim 2, wherein the third member is disposed so that the third member and the first member planarly contact with each other in the press-fitting region and an axis line of the third member extends in a direction different from an axis line of the second member.

15. The joining method for members according to claim 2, wherein at least part of the third member is disposed in a plane in which a joining part between the first member and the second member is positioned so that the third member and the second member planarly contact with each other in the press-fitting region.

16. The joining method for members according to claim 15, wherein
the first member and the third member are made of materials of the same kind,
the third member is disposed outside the second member, and
an insulation member is interposed between the second member and the third member.

17. The joining method for members according to claim 15, wherein
the third member has a sheet shape, and
the third member is wound around the second member.

18. The joining method for members according to claim 2, wherein
the first member has a hollow shape and includes a second insertion hole,
the third member has a hollow shape,
the third member is inserted into the second insertion hole of the first member, and
the third member is expanded and deformed to be joined to the first member by the press-fitting.

19. The joining method for members according to claim 18, wherein the third member is further expanded and deformed to be joined to the second member by the press-fitting.

20. The joining method for members according to claim 2, wherein an insulation member is disposed at least at one of gaps between the first member, the second member, and the third member, or at least at an end part of the first member, the second member, or the third member.

* * * * *